Figure 1:
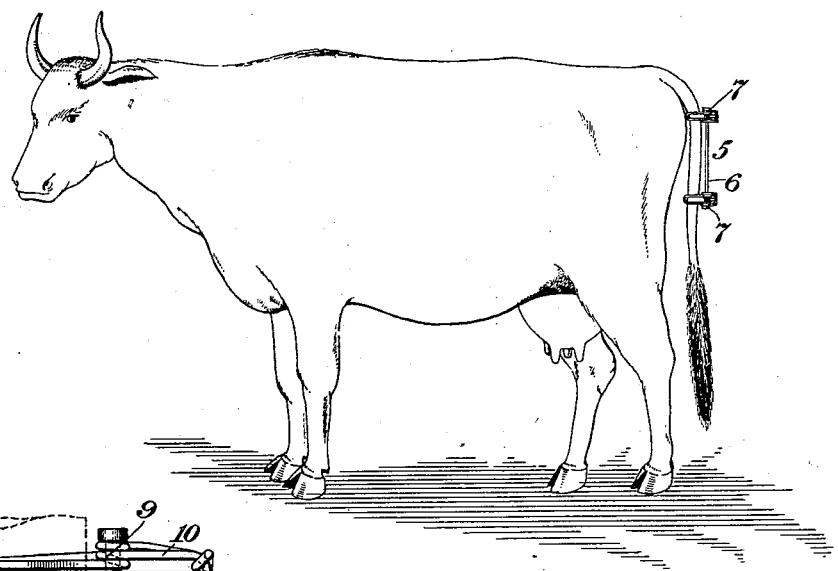

No. 674,543. Patented May 21, 1901.
R. S. THORNTON.
TAIL ATTACHMENT FOR COWS' TAILS.
(Application filed Mar. 13, 1901.)

(No Model.)

WITNESSES
INVENTOR
Ross S. Thornton
BY
Edgar Tate
ATTORNEYS

UNITED STATES PATENT OFFICE.

ROSS STANTON THORNTON, OF COZAD, NEBRASKA.

TAIL ATTACHMENT FOR COWS' TAILS.

SPECIFICATION forming part of Letters Patent No. 674,543, dated May 21, 1901.

Application filed March 13, 1901. Serial No. 50,962. (No model.)

*To all whom it may concern:*

Be it known that I, ROSS STANTON THORNTON, a citizen of the United States, residing at Cozad, in the county of Dawson and State of Nebraska, have invented certain new and useful Improvements in Tail Attachments for Cows' Tails, of which the following is a full and complete specification, such as will enable those skilled in the art to which it appertains to make and use the same.

This invention relates to attachments for cows' tails; and the object thereof is to provide an improved device of this class which is designed to be connected with the cow's tail during the operation of milking and to prevent the cow from switching her tail during such operation.

The invention is fully disclosed in the following specification, of which the accompanying drawings form a part, in which the separate parts of my improvement are designated by the same reference characters in each of the views, and in which—

Figure 2:
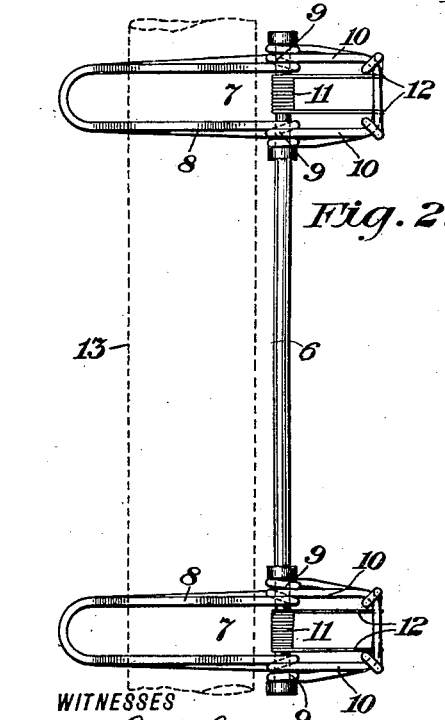

Figure 1 is a side view of a cow, showing the application of my improvement; Fig. 2, a side view of the attachment, and Fig. 3 an end view thereof.

In the drawings forming part of this specification I have shown in Fig. 1 a cow, and in the practice of my invention I provide an attachment 5, which is designed to be connected with the tail of a cow and which consists of a rod or bar 6, provided at both ends with a spring-clamp, said clamps being adapted to be connected with the cow's tail, as shown in the drawings.

Figure 3:
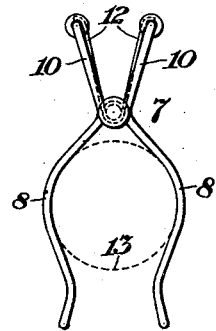

The clamps 7 may be of any desired construction; but, as shown in the drawings, they each consist of two curved spring-jaws 8, which are composed of wire bent to form loops, which are so bent as to grasp and hold the tail of the cow, and the sides of these wire loops are curled around the bar or rod 6, as shown at 9, and are projected to form a yoke-shaped shank 10, and curled on the rod or bar 6, between said sides of each jaw, is a spring 11, the said ends of which bear on the ends of the shank 10 of the jaws 8, as clearly shown at 12. The ends of the spring 11 operate normally to force the jaws 8 together, and in the operation of securing the attachment to the tail of the cow the shanks 10 of the jaws are pressed together, so as to open said jaws, and the tail of the cow is passed between said jaws, as clearly shown in Fig. 1. This operation securely connects the attachment with the tail of the cow and will prevent the switching of the tail in the operation of milking. In Figs. 2 and 3 I have indicated in dotted lines at 13 the tail of a cow, so as to show the operation of the device by the method of placing the attachment.

The body portion or bony part of the cow's tail is made up, as is well known, of separate short sections, which move one upon another, and if a number of these sections be prevented from moving the cow cannot switch her tail, and by providing the separate clamps 7 with a connecting device 6 I prevent the sections of the cow's tail between the clamps 7 from moving, and thus accomplish the desired result.

This device is simple in construction and operation and perfectly adapted to accomplish the result for which it is intended, and changes in and modifications of the construction herein described may be made without departing from the spirit of my invention or sacrificing its advantages.

Having fully described my invention, what I claim as new, and desire to secure by Letters Patent, is—

1. The herein-described attachment for the tail of a cow, consisting of a rod or bar provided at each end with spring clamps or jaws which are adapted to be connected with the tail of a cow, substantially as shown and described.

2. The herein-described attachment for the tail of a cow, said device comprising a plurality of spring clamps or jaws connected by a member which holds them at a predetermined distance apart, substantially as shown and described.

In testimony that I claim the foregoing as my invention I have signed my name, in presence of the subscribing witnesses, this 7th day of March, 1901.

ROSS STANTON THORNTON.

Witnesses:
   WM. L. DEVINE,
   SAML. W. SCHOOLEY.